(12) United States Patent
Nun et al.

(10) Patent No.: US 7,846,529 B2
(45) Date of Patent: Dec. 7, 2010

(54) SELF-CLEANING SURFACES COMPRISING ELEVATIONS FORMED BY HYDROPHOBIC PARTICLES AND HAVING IMPROVED MECHANICAL STRENGTH

(75) Inventors: Edwin Nun, Billerbeck (DE); Markus Oles, Hattingen (DE)

(73) Assignee: Evonik Degussa GmbH, Essen (DE)

( * ) Notice: Subject to any disclaimer, the term of this patent is extended or adjusted under 35 U.S.C. 154(b) by 940 days.

(21) Appl. No.: 11/312,469

(22) Filed: Dec. 21, 2005

(65) Prior Publication Data

US 2006/0147675 A1 Jul. 6, 2006

(30) Foreign Application Priority Data

Dec. 27, 2004 (DE) .................. 10 2004 062 739

(51) Int. Cl.
G11B 5/64 (2006.01)
(52) U.S. Cl. ........................ 428/143; 428/141
(58) Field of Classification Search ................... None
See application file for complete search history.

(56) References Cited

U.S. PATENT DOCUMENTS

| | | | |
|---|---|---|---|
| 3,354,022 A * | 11/1967 | Johnson, Jr. et al. | 428/167 |
| 6,811,856 B2 | 11/2004 | Nun et al. | |
| 6,852,389 B2 | 2/2005 | Nun et al. | |
| 6,858,284 B2 | 2/2005 | Nun et al. | |
| 6,977,094 B2 | 12/2005 | Oles et al. | |
| 2002/0148601 A1 | 10/2002 | Roos et al. | |
| 2002/0150723 A1 | 10/2002 | Oles et al. | |
| 2002/0150726 A1* | 10/2002 | Nun et al. | 428/143 |
| 2002/0164443 A1 | 11/2002 | Oles et al. | |
| 2002/0192385 A1 | 12/2002 | Jenkner et al. | |
| 2003/0013795 A1 | 1/2003 | Nun et al. | |
| 2003/0049396 A1 | 3/2003 | Oles et al. | |
| 2003/0134086 A1 | 7/2003 | Nun et al. | |
| 2003/0147932 A1 | 8/2003 | Nun et al. | |
| 2004/0154106 A1 | 8/2004 | Oles et al. | |

(Continued)

FOREIGN PATENT DOCUMENTS

DE 100 22 246 11/2001

(Continued)

OTHER PUBLICATIONS

English Translation of (EP 1 283 296) (Feb. 12, 2003).*

(Continued)

*Primary Examiner*—Betelhem Shewareged
*Assistant Examiner*—Sathavaram I Reddy
(74) *Attorney, Agent, or Firm*—Oblon, Spivak, McClelland, Maier & Neustadt, L.L.P.

(57) ABSTRACT

The present invention relates to self-cleaning surfaces having improved mechanical stability and a process for the production thereof. The present invention is achieved by producing self-cleaning, hydrophobic, structured surfaces having mixtures of particles, which are fixed on their surface and which comprise structure-producing particles selected from semi-metal or metal oxides, silicas and metal powders, and wax particles. Structured surfaces that are structured by such mixtures of particles are distinguished by substantially higher mechanical stability of the structure and are therefore especially suitable for the production of self-cleaning surfaces, which are exposed to relatively high mechanical loads, such as, for example, the surfaces of tarpaulins, awnings, greenhouse elements, conservatories or truck tarpaulins.

41 Claims, 1 Drawing Sheet

U.S. PATENT DOCUMENTS

| | | |
|---|---|---|
| 2005/0084653 A1 | 4/2005 | Nun et al. |
| 2005/0103457 A1 | 5/2005 | Nun et al. |
| 2005/0112326 A1 | 5/2005 | Nun et al. |
| 2005/0118433 A1 | 6/2005 | Oles et al. |
| 2005/0163951 A1 | 7/2005 | Oles et al. |
| 2005/0167877 A1 | 8/2005 | Nun et al. |
| 2005/0205830 A1 | 9/2005 | Oles et al. |
| 2005/0208269 A1 | 9/2005 | Nun et al. |
| 2005/0227045 A1 | 10/2005 | Oles et al. |
| 2005/0253302 A1 | 11/2005 | Nun et al. |
| 2008/0020190 A1 | 1/2008 | Nun et al. |

FOREIGN PATENT DOCUMENTS

| | | |
|---|---|---|
| DE | 101 18 351 | 10/2002 |
| DE | 101 18 352 | 10/2002 |
| DE | 101 38 036 | 2/2003 |
| EP | 1 283 296 A1 | 2/2003 |
| FR | 268258 | 7/1946 |
| WO | 96/04123 | 2/1996 |
| WO | WO 01/19932 A2 | 3/2001 |
| WO | WO 03/052014 A1 | 6/2003 |

OTHER PUBLICATIONS

English Tranlation of (WO 01/19932) (Mar. 22, 2001).*
U.S. Appl. No. 10/556,092, filed Nov. 9, 2005, Oles, et al.
U.S. Appl. No. 10/526,559, filed Mar. 4, 2005, Nun, et al.
U.S. Appl. No. 11/312,340, filed Dec. 21, 2005, Hennige, et al.
U.S. Appl. No. 10/546,979, filed Aug. 26, 2005, Nun, et al.
U.S. Appl. No. 11/321,285, filed Dec. 21, 2005, Oles, et al.
U.S. Appl. No. 11/312,557, filed Dec. 21, 2005, Oles, et al.
U.S. Appl. No. 10/111,407, filed May 6, 2002, Oles, et al.
U.S. Appl. No. 10/527,641, filed Mar. 14, 2005, Nun, et al.
U.S. Appl. No. 09/241,077, filed Feb. 1, 1999, Peters, et al.
U.S. Appl. No. 10/551,841, filed Oct. 3, 2005, Nun, et al.
U.S. Appl. No. 12/092,086, filed Apr. 30, 2008, Nun, et al.
U.S. Appl. No. 12/092,084, filed Apr. 30, 2008, Nun, et al.
U.S. Appl. No. 12/067,855, filed Mar. 24, 2008, Nun, et al.
U.S. Appl. No. 12/159,103, filed Jun. 25, 2008, Nun, et al.
U.S. Appl. No. 12/094,321, filed May 20, 2008, Nun, et al.
U.S. Appl. No. 12/093,025, filed May 8, 2008, Nun, et al.
U.S. Appl. No. 12/161,031, filed Jul. 16, 2008, Nun, et al.
A. A. Abramzon in Khimia I Zhizu, Issue No. 11, pp. 38-40.

* cited by examiner

Fig. 1

SELF-CLEANING SURFACES COMPRISING ELEVATIONS FORMED BY HYDROPHOBIC PARTICLES AND HAVING IMPROVED MECHANICAL STRENGTH

BACKGROUND OF THE INVENTION

1. Field of the Invention

The present invention relates to self-cleaning surfaces which have an artificial, at least partly hydrophobic surface structure comprising elevations, the elevations being formed by hydrophobic particles fixed to the surface by means of a substrate, said surfaces having improved mechanical strength, a process for the production thereof and the use thereof.

2. Description of the Related Art

Articles having surfaces which are extremely difficult to wet have a number of commercially important features. The most commercially important feature is the self-cleaning effect of surfaces which are difficult to wet, since the cleaning of surfaces is time-consuming and expensive. Self-cleaning surfaces are therefore of very great commercial interest. Adhesion mechanisms are as a rule attributable to interfacial energy parameters between the two surfaces in contact. The systems attempt to reduce their free interfacial energy. If the free interfacial energies between two components are already very low by nature, it may generally be assumed that the adhesion between these two components is weak. What is important is the relative reduction of the free interfacial energy. In the case of pairs having a high and a low interfacial energy, very often the possibilities of interactions are important. Thus, for example on application of water to a hydrophobic surface, it is not possible to bring about a marked reduction of the interfacial energy. This is evident from the fact that the wetting is poor. Applied water forms drops having a very high contact angle. Perfluorinated hydrocarbons, e.g. polytetrafluoroethylene, have very low interfacial energy. In numerous cases, however, wetting of the surface by water is not desired. Thus, wetting of surfaces by water often leads, after run-off, to residues of dissolved or suspended solids as unattractive residues on the surface. This problem occurs in particular in the case of surfaces which are exposed to rainwater and splashes.

Surfaces which are difficult to wet with water are known. It is known that, for achieving a good self-cleaning effect, the surface must also have a microrough surface structure in addition to being hydrophobic. As early as 1947, the relationship between "fine-particled" surface and high contact angle was described in CH 268 258 A and the analogy with the nasturtium was mentioned. In 1982, A. A. Abramzon in Khimia i Zhizu, Issue No. 11, pages 38-40, published the fact that the relationships of roughness and hydrophobicity are realized, for example in the lotus leaf. Elevations of crystalline type having fine structures which are up to a few μm apart are present on the lotus leaf. Water drops therefore come into contact substantially only with the tips of these elevations, so that the contact area between leaf surface and water drop is tiny. This results in very low adhesion of the water drop. Further such surfaces are known in nature, for example of leaves of nasturtium, on ginkgo leaves and on kohlrabi.

U.S. Pat. No. 3,354,022 discloses water-repellent surfaces, the surface having a microrough structure with elevations and depressions and being formed from a hydrophobic material, in particular from a fluorine-containing polymer. In particular, the production of such surface structures is by embossing a structure on surfaces comprising wax, polymers or wax-like compounds. Furthermore, the production of surface structures by the use of particles is described. Firstly, wax particles are fixed to a surface and secondly glass particles surrounded by wax (fluorohydrocarbon wax based on a fluoroalkylethoxymethacrylate polymer) are fixed by means of a molten wax. In the first case, particles having a size of 5 to 80 μm were used; in the second case, glass particles of from 3 to 12 μm diameter, which agglomerated to give 15 to 250 μm particles, were used. A major disadvantage of such coatings having a self-cleaning effect is the low abrasion resistance thereof.

For improving the abrasion resistance of embossed structures, DE 101 38 036 proposes an embossed structure which has, between the elevations, fins which connect the elevations and have, in the middle between two elevations connected by them, a height which is at least 10% less than the height of the elevations. By means of these measures, the stability of such embossed structures is substantially increased. Usually, the embossing and hence the subject matter of DE 101 38 036 are limited to relatively soft materials, such as, for example, polymers, UV-curable finishes or waxes.

In DE 100 22 246, particles are likewise fixed by means of a film-forming binder, in particular by means of waxes, to surfaces for producing structured surfaces, the particles being enclosed or wetted by the film-forming binders. Owing to the waxes used as binders, there is in this process too the problem that coatings produced in this manner and having a self-cleaning effect have a relatively low abrasion resistance.

WO 96/04123 describes a self-cleaning surface of articles which have an artificial surface structure which has elevations and depressions, the structure being defined by a distance between the elevations of from 5 to 200 μm and a height of the elevations of from 5 to 100 μm. The production of this surface is effected, for example, by applying very finely milled Teflon to a surface treated with adhesive, or by embossing a structure onto thermoplastically deformable hydrophobic material. By fixing the particles with adhesive, better mechanical strength of the structure is achieved than in the case of fixing with waxes.

DE 101 18 352 describes the use of particles for producing a surface structure, it being intended to use particles which have a fine structure in the nanometer range. As a result of the fine structure in the nanometer range, an aspect ratio (maximum height over maximum width of the elevation) of the elevations on the particles of greater than 1 is achieved, as can otherwise be achieved only by embossing. In the case of the processes known to date which use particles which have no structure on the surface, such an aspect ratio of greater than 1 cannot of course be achieved, since maximum height and maximum width are the same in the case of a spherical particle. In DE 101 18 352, the particles are fixed by the use of substrate systems, such as, for example, finishes or adhesives. Although surfaces produced in this manner have a better self-cleaning effect, they are still relatively susceptible to mechanical stressing of the structure. The particles can be very rapidly broken out of the surface, particularly by abrasion against other surfaces.

In DE 101 18 351, mixtures of fixing agent particles and particles having a surface with a fine structure in the nanometer range are used, the fixing agent particles being selected from powder coatings or hot melt adhesives and the fixing being effected by brief heating. Although the surface thus produced exhibits substantially better stability of the particles, there is in this process the danger that the fine structure of the particles will be clogged by fixing agent particles.

It was therefore an object of the present invention to increase the mechanical stability of structured surfaces, it being intended to preserve any surface structure present on the particles themselves.

SUMMARY OF THE INVENTION

This and other objects have been achieved by the present invention. In a first embodiment, the invention provides a self-cleaning surface which has an artificial, at least partly hydrophobic surface structure comprising elevations, the elevations being formed by a mixture of hydrophobic particles which is fixed on the surface by means of a substrate, wherein the mixture comprises structure-producing particles selected from the group consisting of semimetal or metal oxides, silicas and metal powders, and wax particles.

In a second embodiment, the invention provides a process for the production of self-cleaning surfaces, in which a suitable, at least partly hydrophobic surface structure is created by fixing a mixture of hydrophobic particles on a surface by means of a substrate, wherein the mixture comprises structure-forming particles selected from the group consisting of semimetal or metal oxides, metal powders and silicas, and wax particles.

BRIEF DESCRIPTION OF THE DRAWING

In the accompanying drawing.

DETAILED DESCRIPTION OF THE INVENTION

Surprisingly, it was found that the mechanical stability of the surface structure produced is substantially increased by the use of mixtures of hydrophobic metal oxide particles and wax particles as structure formers, which are fixed on a surface by means of a substrate. This can possibly be explained by the fact that the wax particles between the metal oxide particles display a supporting effect similar to the fins in DE 101 38 036.

The present invention therefore relates to a self-cleaning surface which has an artificial, at least partly hydrophobic surface structure comprising elevations, the elevations being formed by a mixture of hydrophobic particles which is fixed to the surface by means of a substrate, wherein the mixture comprises structure-producing particles selected from semimetal or metal oxides, silicas and metal powders, and wax particles.

The present invention also relates to a process for the production of self-cleaning surfaces, in which a suitable, at least partly hydrophobic surface structure is created by applying and fixing a mixture of hydrophobic particles to a surface by means of a substrate, wherein the mixture comprises structure-forming particles selected from semimetal or metal oxides, metal powders and silicas, and wax particles.

The present invention also relates to a particle composition suitable for the production of self-cleaning surfaces, wherein the composition comprises structure-producing particles selected from semimetal or metal oxides, silicas and metal powders, and from 1 to 75% by weight of wax particles.

The present invention also relates to the use of the process according to the invention for the production of self-cleaning surfaces on rigid or nonrigid surfaces of articles.

By means of the process according to the invention, self-cleaning surfaces which have a surface structure comprising elevations and hence also depressions are obtainable, elevations being formed by particles which preferably have a fissured structure in the nanometer range. By use of mixtures of structure-forming particles and wax particles, a substantially higher strength of the structured surface with respect to mechanical loads, such as, for example, abrasion or scratching, is achieved.

As could be shown with reference to the surfaces according to Example 1, on which a particle mixture of 95% by weight of hydrophobic pyrogenic silica and 5% by weight of PTFE-modified polyethylene wax by means of a substrate, it was possible to increase the maximum abrasion load from 100 cycles to 2000 cycles.

The mixtures are fixed firmly to the surface by means of a substrate, in particular of a finish or adhesive. The effect according to the invention is presumably due to the wax particles. These presumably perform the function of a support body, which prevents the structure-producing particles from falling over and hence, in the case of nonflexible fixing to the surface by the substrate, frequently prevents them from being torn out. Owing to the resilience or plasticity usually present in a wax, the particles can within certain limits avoid the pressure which is exerted on the structure by the mechanical load.

In spite of the use of wax particles, the positive effect which is obtained by the use of structure-producing particles having a fine structure in the nanometer range, and which is due to the aspect ratio of the elevations in the nanometer range, remains in the present process according to the invention since the wax particles or parts thereof do not adhesively bond the fine structure by the fixing by means of an adhesive or finish. This is in particular because no thermal energy has to be applied for the fixing and hence no melting of the wax which subsequently smoothes the fine structure can occur.

The self-cleaning properties of the surfaces according to the invention are not adversely affected by the use of wax particles which have hydrophobic properties. Rather, if small wax particles are used as structure-producing particles, the spacing of the highest elevation which are formed by the structure-producing particles can be very exactly adjusted as a function of the mixing ratio of wax particles to structure-producing particles, since usually only a monolayer of particles is fixed on the surface by the substrate and hence the spacing of the highest elevations relative to one another is determined by the number of wax particles surrounding them as nearest neighbors.

The present invention is described below without having any intention to limit the invention to the embodiments described. In the context of the present invention, substances which are used for fixing particles on a surface are referred to as substrates.

Where range data or preferred ranges are stated in the following text, these also disclose all possible subranges which may be formed within these ranges or preferred ranges. For the sake of clarity of the description, an explicit listing of all possible subranges is therefore dispensed with.

Where the inventions, or features thereof, are disclosed in the following text by lists or selections of substances, parameters or conditions to be used, portions which are obtainable by deleting or disclaiming individual, or a plurality of, substances, parameters or conditions are also part of the disclosure content of the following description. For the sake of clarity of the description, an explicit description of all embodiments of possible portions which can be obtained by deletion or disclaiming is therefore dispensed with.

The self-cleaning surfaces according to the invention which have an artificial, at least partly hydrophobic surface structure, the elevations being formed by a mixture of hydrophobic particles which is fixed on the surface by means of a substrate, are distinguished by the fact that the mixture comprises structure-producing particles selected from semimetal or metal oxides, silicas and metal powders, and wax particles. The mixture preferably comprises from about 1 to about 75 percent by weight, preferably from 2 to 70 percent by weight, more preferably from 3 to 60 percent by weight and most preferably from 5 to 25 percent by weight of wax particles. The mixture includes all values and subvalues therebetween, especially including 2.5, 5, 7.5, 9, 12, 18, 23, 25, 28, 30, 35, 42, 47, 52, 55, 58.5, 62, 67, 69, 71, and 74.5 percent by weight. Depending on particle size or the ratios of the particle sizes of wax particles to structure-producing particles, the spacing of the highest elevations formed by the structure-producing particles is determined via the volume ratio as described above if, as preferred, a monolayer of particles is fixed to the surface by means of the substrate.

The surface structure formed by the hydrophobic particles and having self-cleaning properties preferably has elevations having a mean height of from about 20 μm to about 25 μm and a mean spacing of up to about 25 μm, preferably having a mean height of from 50 nm to 10 μm and/or a mean spacing of up to 10 μm and more preferably having a mean height of from 50 nm to 4 μm and/or a mean spacing of up to 4 μm. Most preferably, the surfaces according to the invention preferably have elevations having a mean height of from 0.25 to 1 μm and a mean spacing of less than 1 μm. The mean height includes all values and subvalues therebetween, especially including 0.025, 0.06, 0.1, 0.15, 0.25, 0.3, 0.5, 1.0, 2.5, 5.5, 8, 10, 12.5, 15, 17.5, 20, 22, and 24.5 μm. The mean spacing includes all values and subvalues therebetween, especially including 0.30, 0.35, 0.40, 0.45, 0.50, 0.55, 0.60, 0.65, 0.70, 0.75, 0.8, 0.85, 0.9, and 0.95 μm. In the context of the present invention, the mean spacing of the elevations is understood as meaning the distance from the highest elevation of one elevation to the next highest elevation. If an elevation has the shape of a cone, the vertex of the cone is the highest elevation of the elevation. If the elevation is a cuboid, the top surface of the cuboid is the highest elevation of the elevation.

In addition to the spacing of the elevations, the structure of the surface is also determined by the number and size of the wax particles present. Thus, a surface in which 25% of the particles are wax particles and in which the wax particles are 0.5 times the size of the structure-forming particles has a structure in which every fourth elevation is 50% lower than the height of the elevations directly surrounding it. If the proportion of wax particles is 75%, every fourth elevation has a height which is 100% higher than the height of the elevations of the neighbors directly surrounding it. Preferably, the surface according to the invention has a structure in which every second to every hundredth elevation has a height which is about 50% lower, more preferably from 50 to 10% lower, and most preferably from 30 to 10% lower, than the height of the neighbors directly surrounding it.

The self-cleaning properties of the surface structure are due to the wetting properties, which are described by the contact angle which a water drop makes with a surface. A contact angle of 0 degrees means complete wetting of the surface. The measurements of the static contact angle are effected as a rule by means of apparatuses in which the contact angle is determined optically. On smooth hydrophobic surfaces, static contact angles of less than 125° are usually measured. The present films having self-cleaning surfaces have static contact angles of preferably greater than about 130°, more preferably greater than 140° and most preferably greater than 145°. It was also found that a surface has good self-cleaning properties only when it has a difference between advancing and receding contact angle of not more than about 10°, and it is for this reason that surfaces according to the invention preferably have a difference between advancing and receding contact angle of less than 10°, more preferably less than 5° and most preferably less than 4°. For the determination of the advancing contact angle, a water drop is placed on the surface by means of a cannula and the drop on the surface is increased in size by adding water through the cannula. During the increase in size, the edge of the drop glides over the surface, and the contact angle is determined optically as an advancing contact angle. The receding contact angle is measured on the same drop, except that water is withdrawn from the drop through the cannula, and the contact angle is measured optically during the decrease in the size of the drop. The difference between the two angles is referred to as hysteresis. The smaller the difference, the lower is the interaction of the water drop with the surface of the substrate and the better is the lotus effect (self-cleaning property).

The self-cleaning surfaces according to the invention also have a rolling angle of, preferably, less than about 20°, more preferably less than 10° and most preferably less than 3°. The rolling angle determined is the angle of inclination at which a 60 μl drop of water which is applied to a horizontal surface rolls off by itself from the resulting skew plane and as a result of raising the surface on one side.

The surfaces according to the invention which have a surface structure with self-cleaning properties preferably have an aspect ratio of the elevations of greater than about 0.15. Preferably, the elevations which are formed by the particles themselves have an aspect ratio of from 0.3 to 0.9, and more preferably from 0.5 to 0.8. The aspect ratio includes all values and subvalues therebetween, including 0.20, 0.25, 0.35, 0.4, 0.45, 0.55, 0.6, 0.65, 0.7, 0.75, and 0.85. The aspect ratio is defined as the quotient of maximum height and maximum width of the structure of the elevations.

In order to achieve said aspect ratios, it is advantageous if at least some of the particles, preferably more than about 50% of the particles, are embedded in the substrate only up to about 90% of their diameter. The surface therefore preferably comprises particles which are anchored in the substrate with from 10 to 90%, more preferably from 20 to 50%, and most preferably from 30 to 40% of their mean particle diameter, and thus still project from the film with parts of their at least partly inherently fissured surface. In this way, it is ensured that the elevations which are formed by the particles themselves have a sufficiently great aspect ratio of, preferably, at least 0.15. In this way, it is also ensured that the firmly bound particles are bound in a very stable manner to the surface of the film. Here, the aspect ratio is defined as the ratio of maximum height to maximum width of the elevations. A particle which is assumed to be ideally spherical and projects to an extent of 70% from the substrate has an aspect ratio of 0.7 according to this definition.

Preferred hydrophobic, structure-producing particles have a particle diameter of from about 0.02 to about 50 μm, more preferably from 0.1 to 25 μm and most preferably from 0.5 to 10 μm. The particle diameter includes all values and subvalues therebetween, especially including 0.025, 0.06, 0.1, 0.15, 0.25, 0.3, 0.5, 1.0, 2.5, 5.5, 6, 8, 10, 12.5, 15, 17.5, 20, 22, 25, 30, 35, 40, 42, 45, 47, and 49.5 μm. Suitable particles can, however, also have a diameter of less than 500 nm or may be formed from primary particles to give agglomerates or aggregates having a size of from 0.2 to 50 μm.

The structure-producing particles which form the elevations on the surface are preferably selected from silicates, minerals, metal oxides, metal powders, silicas, pigments or polymers, very particularly preferably from pyrogenic silicas, precipitated silicas, alumina, mixed oxides, doped silicates, titanium dioxides or pulverulent polymers.

Particularly preferred microparticles which form the elevations of the structured surface are those which have an irregular fine structure in the nanometer range on the surface. Fine structures in the nanometer range are understood as meaning structures which have heights, widths and/or spacings in the range from about 1 to about 1000 nm. Preferably, the elevations have on average a height of from 20 to 500 nm, more preferably from 50 to 200 nm and most preferably from 50 to 150 nm. The average height includes all values and subvalues therebetween, especially including 20.5, 25, 30, 40, 50, 55, 60, 70, 80, 85, 90, 100, 110, 115, 120.5, 130, 135, 145, 180, 200, 225, 240, 250, 280, 295, 300, 330, 350, 370, 380, 390, 400, 420, 480, 510, 520.5, 560, 580, 600, 630, 640.5, 690, 700, 780, 800, 820, 850, 890, 900, 950, 980, 995, and 999.5 nm. The spacing of the elevations or depressions on the particles is preferably less than about 500 nm, preferably less than 200 nm, more preferably from 25 to 175 nm and most preferably from 50 to 150 nm. The microparticles having the irregular fine structure preferably have elevations or fine structures which have an aspect ratio or greater than 1, particularly preferably greater than 1.5. The aspect ratio is once again defined as the quotient of maximum height and maximum width of the elevation.

Figure 1:
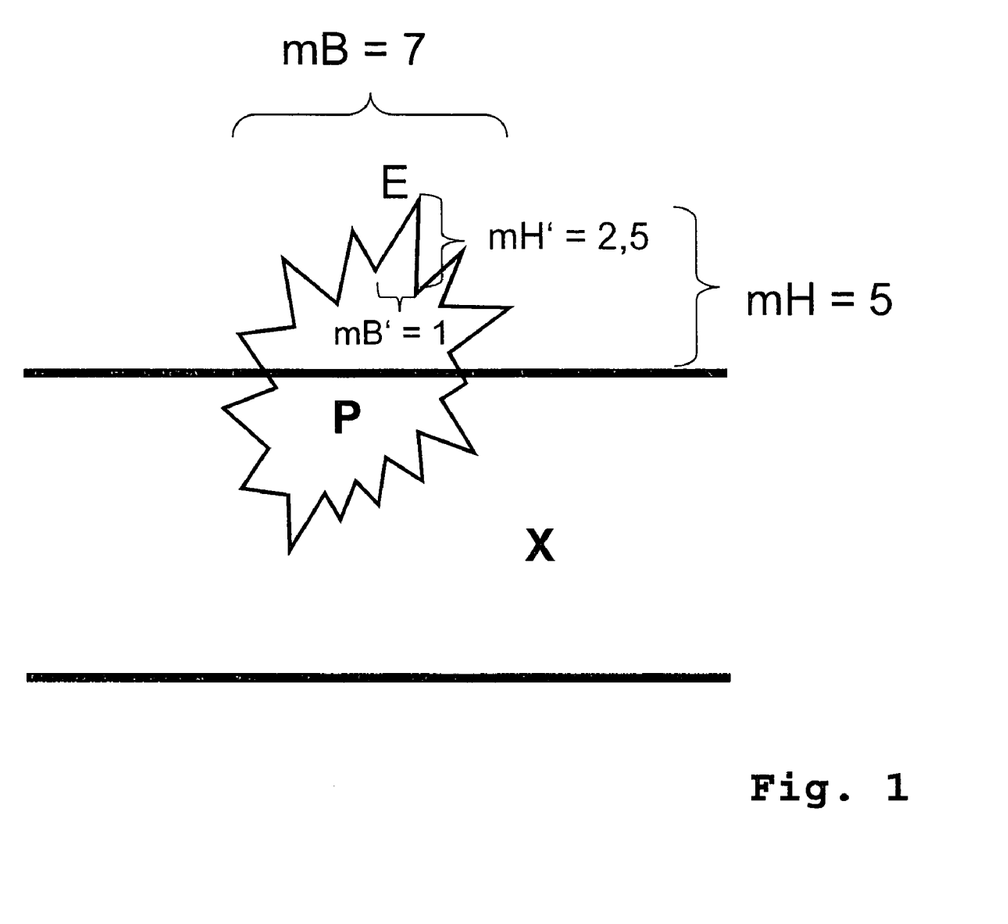
FIG. 1 is a schematic illustration of a surface coated according to the invention comprising particles, and the difference between the elevations formed by the particles and the elevations formed by the fine structure.

FIG. 1 schematically illustrates the difference between the elevations which are formed by the particles and the elevations which are formed by the fine structure. FIG. 1 shows the surface of a sheet-like extrudate X which comprises particles P (for simplicity of representation, only one particle is shown). The elevation which is formed by the particle itself has an aspect ratio of about 0.71, calculated as the quotient of the maximum height of the particle mH, which is 5, since only that part of the particle which projects from the surface of the sheet-like extrudate X contributes to the elevation, and the maximum width mB, which is 7 in relation thereto. A selected elevation of the elevations E which are present on the particle due to the fine structure of the particles has an aspect ratio of 2.5, calculated as the quotient of the maximum height of the elevation mH', which is 2.5, and the maximum width mB', which is 1 in relation thereto. Particularly preferred structure-producing particles are selected from particles of alumina and precipitated or pyrogenic silica and have an irregular fine structure in the nanometer range on the surface.

The wax particles according to the invention which are present preferably comprise ethylenically unsaturated polymers which may also be fluorinated or perfluorinated. Such wax-like compounds are obtainable, for example, under the trade names COPO-WAX 4110 or COPO-WAX 4125 (Coating Products). These are polytetrafluoroethylene-modified polyethylene waxes. Pure polyethylene waxes are sold, for example, under the trade name VESTOWAX by Degussa, such as, for example, VESTOWAX PM 3016 V. Fluorinated waxes are obtainable, for example, under the names Zonyl (Du Pont) or Dyneon TFM 1700 (Dyneon GmbH). Preferred wax particles have a mean particle size which is from 0.5 to 2 times the mean particle size of the structure-producing particles. Preferred wax particles have a mean particle size which is from about 0.5 to about 20 times, preferably from 0.5 to 1 times, more preferably from 0.5 to 0.9 times and most preferably from 0.7 to 0.8 times, the mean particle size of the structure-producing particles. The mean particle size includes all values and subvalues therebetween, especially including 0.55, 0.6, 1, 1.5, 2.5, 3, 5, 10, 12.5, 15, 17, and 19.5 times the mean particle size of the structure-producing particles. It is particularly advantageous if the wax particles have a smaller particle size than the structure-producing particles. This is particularly advantageous when the numerical ratio of wax particles to structure-producing particles is less than or equal to 1:1, since in this case the wax particles ensure a spacing of the structure-producing particles relative to one another at which it is advantageous that the highest elevations are provided by the structure-producing particles.

The substrate according to the invention which is present, and by means of which the mixture of particles is fixed to the surface, is preferably a finish or adhesive cured by means of thermal energy and/or light energy, a two-component finish or adhesive system or another reactive finish or adhesive system, the curing preferably being effected by polymerization or crosslinking. Particularly preferably, the cured finish comprises polymers and/or copolymers of monounsaturated and/or polyunsaturated acrylates and/or methacrylates or mixtures thereof. Further finish systems are evident to the person skilled in the art. The mixing ratios can be varied within wide limits. It is also possible for the cured finish to comprise compounds having functional groups, such as, for example, hydroxyl groups, epoxide groups or amino groups, or fluorine-containing compounds, such as, for example, perfluorinated esters of acrylic acid. This is advantageous in particular when the compatibility of finish and hydrophobic particles, such as, for example, of Aerosil R 8200, with one another is tailored by means of N-[2-(acryloyloxy)ethyl]-N-ethylperfluorooctane-1-sulfonamide. Finishes which may be used are not only finishes based on acrylic resin but also polyurethane-based finishes or finishes which comprise polyurethane acrylates or silicone acrylates.

The surfaces according to the invention are preferably obtainable by a process for the production of self-cleaning surfaces, in which a suitable, at least partly hydrophobic surface structure is created by fixing a mixture of hydrophobic particles on the surface by means of a substrate, which process is distinguished by the fact that the mixture comprises structure-forming particles selected from semimetal or metal oxides, metal powders and silicas, and wax particles. The structure-producing particles used can be selected from those particles described above. In the process according to the invention, too, those structure-forming particles selected from alumina and precipitated or pyrogenic silica which have a fine structure in the nanometer range are preferably used. Particularly preferred particles are pyrogenic silicas, as can be obtained, for example, under the names Aerosil® VPR 411, Aerosil® R202, Aerosil® VPLE 8241 or Aerosil® R 812S from Degussa AG. The fine structure is defined as described above. The preferably used silicas preferably have a dibutyl phthalate adsorption, based on DIN 53 601, of from about 100 to about 350 ml/100 g, more preferably from 250 to 350 ml/100 g. The adsorption includes all values and subvalues therebetween, especially including 100.5, 102, 105, 110, 120, 130, 135, 150, 160, 175, 200, 210, 212.5, 230, 245, 275, 300, 310, 330, 340, 345, 349.5 ml/100 g. Preferably used structure-producing particles are those which have a mean particle size of from 20 nm to 50 μm.

The structure-producing particles may themselves be hydrophobic, such as, for example, particles comprising PTFE, or the particles used may have been rendered hydrophobic. The imparting of hydrophobic properties to the particles can be effected in a manner known to the person skilled in the art. Typical particles which have been rendered hydrophobic are, for example, silica powders, such as, for example, Aerosil R 8200 (Degussa AG) which are commercially available.

Preferably used wax particles are those which satisfy the abovementioned conditions, in particular those which have a mean particle size which is from 0.5 to 20 times the mean particle size of the structure-producing particles. Preferably used wax particles are those which comprise ethylenically unsaturated polymers which may optionally also be fluorinated or perfluorinated.

The mixture used preferably comprises from about 1 to about 75 percent by weight, preferably from 2 to 70 percent by weight, more preferably from 3 to 60 percent by weight, and most preferably from 4 to 50 and from 5 to 25, percent by weight of wax particles. The percent by weight of wax particles includes all values and subvalues therebetween, especially including 1.5, 5, 6, 10, 15, 20, 22.5, 30, 35, 40, 45, 52, 58, 62.5, 66, 67, 70, and 74.5 percent by weight. The particle mixture can be obtained by simple dry blending of the particles. Temperature-neutral, intensively mixing apparatuses, such as tumbler mixers, are preferred. Further suitable apparatuses are known to the person skilled in the art.

The process according to the invention preferably comprises the steps:

application of a curable substance as a substrate to a surface, application of the mixture of particles to the substrate, fixing of the particles by curing of the substrate.

The application of the curable substance can be effected, for example, by spraying on, knife coating, spreading or sprinkling. The curable substance is preferably applied in a thickness of from about 1 to about 100 μm, more preferably in a thickness of from 5 to 50 μm. The thickness includes all values and subvalues therebetween, especially including 1.5, 5, 6, 10, 15, 20, 22.5, 30, 35, 40, 45, 52, 58, 62.5, 66, 67, 70, 74.5, 80, 85, 90, 92.5, 95, 97, and 99.5 μm. Depending on the viscosity of the curable substance, it may be advantageous to allow the substance to partially cure or partially dry before application of the particles. Ideally, the viscosity of the curable substance is chosen so that the particles applied can at least partly sink into the curable substance, but the curable substance or the particles applied thereto no longer run when the surface is placed in an upright position.

The application of the particles can be effected by customary methods, such as spraying on or dusting with powder. In particular, the application of the particles can be effected by atomization using an electrostatic spray gun. After the application of the particles, excess particles, i.e., particles which do not adhere to the curable substance, can be removed from the surface by shaking, brushing off or blowing off. These particles can be collected and reused.

For example, a finish or adhesive which comprises at least mixtures of monounsaturated and/or polyunsaturated acrylates and/or methacrylates and/or polyurethanes and/or silicone acrylates and/or urethane acrylates, and further systems available to the person skilled in the art, preferably mixtures of monounsaturated and/or polyunsaturated acrylates and/or methacrylates, can be used as the curable substance (substrate). The mixing ratios can be varied within wide limits. A finish or adhesive curable by means of thermal or chemical energy and/or light energy is particularly preferably used.

A finish/adhesive or a finish system or adhesive system which has hydrophobic properties is preferably chosen as the curable substance, since the particles used likewise have hydrophobic properties and only in this way can adhesion of the particles of the particle mixture be ensured.

It may be advantageous if the mixtures used as finish/adhesive comprise compounds having functional groups, such as, for example, hydroxyl groups, epoxide groups or amino groups, or fluorine-containing compounds, such as, for example, perfluorinated esters of acrylic acid. This is advantageous in particular when the compatibility (with respect to the hydrophobic properties) of finish and hydrophobic particles, such as, for example, of Aerosil VRP 411, with one another is tailored by means of N-[2-(acryloyloxy)ethyl]-N-ethylperfluorooctane-1-sulfonamide. Curable substances used may be not only finishes based on acrylic resin but also polyurethane-based finishes or polyurethane acrylates or silicone acrylates. Two-component finish systems or other reactive finish systems can also be used as curable substances.

The fixing of the particles on the substrate is effected by curing of the substrate, this preferably being effected by thermal and/or chemical energy and/or light energy, depending on the finish system or adhesive system used. The curing of the substrate, initiated by chemical or thermal energy and/or light energy, can be effected, for example, by polymerization or crosslinking of the components of the finishes/adhesives or finish systems or adhesive systems. The curing of the substrate is particularly preferably effected by light energy and very particularly preferably the polymerization of the substrate is effected by light of a medium-pressure mercury lamp in the UV range. The curing of the substrate is preferably effected under an inert gas atmosphere, very particularly preferably under a nitrogen atmosphere.

Depending on the thickness of the applied curable substance and diameter of the particles used, it may be necessary to limit the time which elapses between application of the particles and curing of the curable substance, in order to avoid complete immersion of the particles in the curable substance. The curable substance is preferably cured within from about 0.1 to about 10 minutes, more preferably within from 1 to 5 minutes, after application of the particles. The curing time includes all values and subvalues therebetween, especially including 0.15, 0.5, 1.5, 2, 3.5, 4, 6, 7.5, 8, and 9.5 minutes.

In the process according to the invention, particle compositions suitable for the production of self-cleaning surfaces are preferably used, wherein the composition comprises hydrophobic, structure-producing particles selected from metal oxides, silicas and metal powders, and from about 1 to about 75% by weight, preferably from 2 to 70% by weight, preferably from 3 to 60% by weight and more preferably from 4 to 50% by weight, most preferably from 5 to 25% by weight, of wax particles. The percent by weight of metal oxides, silicas and metal powders includes all values and subvalues therebetween, especially including 1.5, 5, 6, 10, 15, 20, 22.5, 30, 35, 40, 45, 52, 58, 62.5, 66, 67, 70, and 74.5% by weight. The composition particularly preferably comprises structure-producing particles which have a fine structure in the nanometer range and which are selected from particles of alumina or precipitated or pyrogenic silica.

It may be advantageous to treat the surface produced according to the invention, after fixing of the particles on the substrate, with a material which imparts hydrophobic properties to the surface. This can be effected, for example, by treating the surface comprising the hydrophobic particles with at least one compound from the group consisting of the alkylsilanes or the perfluoroalkylsilanes, which are obtainable, for example, from Degussa AG. The treatment is preferably effected by immersing the surface which comprises the hydrophobic structure-forming particles and is additionally to be rendered hydrophobic in a solution which comprises a water repellent reagent, such as, for example, alkylsilanes, allowing excess water repellent reagent to drip off and heating the surface at as high a temperature as possible. The maximum applicable temperature is limited by the softening temperatures of the substrate.

The process according to the invention can be used outstandingly for the production of self-cleaning surfaces on planar or nonplanar articles, in particular on nonplanar articles. This is possible only to a limited extent by means of the conventional processes. Nonplanar articles, such as, for example, sculptures, are obtainable only to a limited extent, if at all, by means of processes in which prefabricated films are applied to a surface or in the case of processes in which a structure is to be created by embossing. Of course, the process according to the invention can, however, also be used for the production of self-cleaning surfaces on articles having planar surfaces, such as, for example, greenhouses or means of transport, in particular motor vehicles. In particular, the use of the process according to the invention for the production of self-cleaning surfaces on greenhouses has advantages since, by means of the process, self-cleaning surfaces can be produced, for example, also on transparent materials, such as glass or Plexiglas®, and the self-cleaning surface can be made transparent at least to the extent that sufficient sunlight for the growth of the plants in the greenhouse can penetrate through the transparent surface provided with a self-cleaning surface. In contrast to conventional greenhouses which have to be cleaned regularly to remove foliage, dust, lime and biological material, such as, for example, algae, greenhouses which have a surface according to the invention can be operated with relatively long cleaning intervals. Owing to the given increased mechanical strength, it is possible to walk on such greenhouses or conservatories, which is advantageous both when erecting them and in the case of repairs or cleaning work due to fallen branches.

The process according to the invention can moreover be used for the production of self-cleaning surfaces on nonrigid surfaces of articles, such as, for example, screens or other surfaces which are kept flexible. The process according to the invention can be very particularly preferably used for the production of self-cleaning surfaces on flexible or nonflexible walls in the sanitary sector. Such walls may be, for example, partitions in public lavatories, walls of shower cubicles, swimming pools or saunas, but also shower curtains (flexible wall).

The present invention is explained in more detail with reference to the FIG. 1, without it being intended to limit the invention to these embodiments.

FIG. 1 schematically shows the surface of a surface which is coated according to the invention and comprises particles P (for simplification of the representation, only one particle is shown). The elevation which is formed by the particle itself has an aspect ratio of about 0.71, calculated as the quotient of the maximum height of the particle mH, which is 5, since only that part of the particle which projects from the surface of the substrate material X contributes to the elevation, and the maximum width mB, which is 7 in relation thereto. A chosen elevation E of the elevations, which is present on the particles owing to the fine structure of the particles, has an aspect ratio of 2.5, calculated as the quotient of the maximum height of the elevation mH', which is 2.5, and the maximum width mB', which is 1 in relation thereto.

The following examples are intended to explain the surfaces according to the invention or the process for the production of the surfaces in more detail, without it being intended to limit the invention to these embodiments.

EXAMPLES

Example 1

A 25 μm thick finish coat of a UV-curable acrylate finish, prepared from a mixture of three parts by weight of hexanediol diacrylate and 2 parts by weight of pentaerythrityl tetraacrylate, to which, based on this mixture, additionally 10% by mass of Plex 4092 F from Röhm, 10% by mass of methyl methacrylate, 10% by mass of 2-hydroxyethyl methacrylate and 2% by mass of Darocur 1173 (Ciba Spezialitätenchemie) as a curing agent were added, was applied by means of a knife coater to sheets of polymethyl methacrylate. A mixture of 95% by mass of pyrogenic water-repellent silica (Aerosil VPLE 8241, Degussa AG) and 5% by mass of a pulverulent wax (cf. Table 1) was applied to the still moist finish coat by means of an electrostatic spray system from Nordson. After the UV curing of the finish, the surfaces obtained were assessed with respect to their self-cleaning properties. It was found that a water drop of 20 μl rolled off by itself (was repelled) from all treated sheets at a small angle of inclination. +++ means that a small angle of inclination of <10° (estimated) leads to the drop rolling off. +++! is assigned as an assessment if virtually no interaction can be found between surface and drop. On surfaces thus assessed, a drop rolls off even when the substrate is tapped carefully.

The abrasion resistance was then tested. This was effected by testing the self-cleaning properties again after a number of 10, 20, 30, 50, 150 and 200 cycles. The abrasion tests were carried out until wetting of the tested area of the treated PMMA sheet by water took place and the water drop did not run off even at an angle of 90° to the horizontal. Wetting was defined as the situation when an applied water drop (20 μl) spread on the surface. The abrasion test was carried out using a rotating round PET nonwoven of 250 g/m² and of 2 cm diameter, which was loaded with a weight of 611 g.

Table 1 below shows a list of the silica/wax particle mixtures used and the results of the abrasion tests. After 10, 20 and 30 rotation cycles, no deterioration in the self-cleaning properties was found.

TABLE 1

| Test No. | Wax/manufacturer | Behavior of a water drop after a certain number of cycles | | | | Wetting after number of abrasion cycles |
| --- | --- | --- | --- | --- | --- | --- |
| | | 50 cycles | 100 cycles | 150 cycles | 200 cycles | |
| 1 | Copo-Wax 4110/ Coating Products | Repelled | Repelled | Partly wetted | Wetted | 200 |
| 2 | Copo-Wax 4125/ Coating Products | Repelled | Repelled | Partly wetted | Wetted | 200 |
| 3 | Copo-Wax 2110/ Coating Products | Repelled | Partly wetted | Partly wetted | Wetted | 200 |
| 4 | Vestowax X 4118/ Degussa AG | Repelled | Wetted | | | 100 |

TABLE 1-continued

| Test No. | Wax/manufacturer | Behavior of a water drop after a certain number of cycles | | | | Wetting after number of abrasion cycles |
|---|---|---|---|---|---|---|
| | | 50 cycles | 100 cycles | 150 cycles | 200 cycles | |
| 5 | Vestowax FM 1012/Degussa AG | Repelled | Wetted | | | 100 |
| 6 | Vestowax A 616 SF/Degussa AG | Wetted | | | | 50 |
| 7 | Zonyl/Du Pont | Repelled | Wetted | | | 100 |
| 8 | None | Repelled | Wetted | | | 50 |

Example 2

A 25 µm thick coat of a UV-curable acrylic finish system according to example 1, which additionally comprises, based on the mixture, 2% by mass of the leveling agent BYK 3700 (BYK), was applied to sheets of polymethyl methacrylate by means of a film-drawing frame. Various particle mixtures were scattered onto the still moist finish coats by hand using a "tea strainer". The particle mixtures were obtained by mixing 2 g of pyrogenic water-repellent silica (Aerosil VPLE 8241, Degussa AG) with wax particles Copo-Wax 4110 or Copo-Wax 4125 in the amount stated in table 2 in a 30 ml bottle by means of a magnetic stirrer. Excess particles were removed from the surface by tapping. After the UV curing of the finish, the sheets obtained or the surfaces thereof were assessed as above with respect to their self-cleaning properties.

TABLE 2

| Test | Wax | Addition of Aerosil (%) | Remark | Lotus effect |
|---|---|---|---|---|
| 8 | Copo-Wax 4110 | 5 | | +++! |
| 9 | Copo-Wax 4110 | 10 | | +++! |
| 10 | Copo-Wax 4110 | 50 | | +++! |
| 11 | Copo-Wax 4110 | Pure wax | Application irregular since particles agglomerate | +++ |
| 12 | Copo-Wax 4125 | 5 | | +++! |
| 13 | Copo-Wax 4125 | 10 | | +++! |
| 14 | Copo-Wax 4125 | Pure wax | Application irregular since particles agglomerate | +++ |
| 15 | No wax | Pure Aerosil | | +++! |

As shown by the results listed in Table 2, all sheets or surfaces exhibited a good lotus effect. Impairment of the lotus effect by the wax particles was not observed, except for the case where only wax particles were used. In this case, a slight deterioration in the properties was observed.

The present application is based on German Patent Application No. DE 10 2004 062 739.8 filed in the German Patent Office on Dec. 27, 2004, which is hereby incorporated by reference in its entirety.

Obviously, numerous modifications and variations of the present invention are possible in light of the above teachings. It is therefore to be understood that within the scope of the appended claims, the invention may be practiced otherwise than as specifically described herein.

What is claimed is:

1. A self-cleaning surface which has an artificial, at least partly hydrophobic surface structure comprising elevations, wherein the elevations are formed by a mixture of hydrophobic particles which are fixed on the surface by a substrate,
wherein the mixture comprises structure-producing particles selected from the group consisting of a semimetal oxide powder, a metal oxide powder, a silica powder, and a metal powder, and
wax particles consisting of wax; and
wherein both the structure-producing particles and the wax particles form the elevations.

2. The self-cleaning surface as claimed in claim 1, wherein the substrate is a finish or adhesive cured by thermal energy or chemical energy or light energy.

3. The self-cleaning surface as claimed in claim 1, wherein the substrate in the form of a cured finish comprises mixtures of two or more selected from the group consisting of monounsaturated acrylates, polyunsaturated acrylates monounsaturated methacrylates, polyunsaturated methacrylates and polyurethane.

4. The self-cleaning surface as claimed in claim 1, wherein the structure-producing particles have a mean particle size of from 20 nm to 50 µm.

5. The self-cleaning surface as claimed in claim 4, wherein the structure-producing particles are selected from alumina, precipitated or pyrogenic silica and have a fine structure in the nanometer range.

6. The self-cleaning surface as claimed in claim 1, wherein the wax particles have a mean particle size which is from 0.5 to 20 times the mean particle size of the structure-producing particles.

7. The self-cleaning surface as claimed in claim 6, wherein the mixture comprises from 1 to 75 percent by weight of the wax particles.

8. A process for the production of self-cleaning surfaces, comprising:
fixing a mixture of hydrophobic particles on a surface of a substrate to form an at least partly hydrophobic surface having elevations, wherein the mixture comprises structure-forming particles selected from the group consisting of a semimetal oxide, a metal oxide, and a metal powder; and wax particles consisting of wax; and
wherein both the structure-producing particles and the wax particles form the elevations.

9. The process as claimed in claim 8, wherein the structure-forming particles are selected from the group consisting of alumina, precipitated silica, and pyrogenic silica, which have a fine structure in the nanometer range.

10. The process as claimed in claim 8, which comprises:
a) applying a curable substance as substrate to a surface,
b) applying the mixture of particles to the substrate, and
c) fixing of the particles by curing of the substrate.

11. The process as claimed in claim 10, wherein the curing of the substrate is effected by at least one of thermal energy, chemical energy and light energy.

12. The process as claimed in claim 10, wherein a finish which comprises at least mixtures of two or more selected from the group consisting of monounsaturated acrylates, polyunsaturated acrylates, monounsaturated methacrylates, polyunsaturated methacrylates, polyurethanes, silicone acrylates and urethane acrylates is the curable substance.

13. The process as claimed in claim 12, wherein a finish which has hydrophobic properties is the curable substance.

14. The process as claimed in claim 8, wherein the structure-producing particles have a mean particle size of from 20 nm to 50 μm.

15. The process as claimed in claim 8, wherein wax particles having a mean particle size which is from 0.5 to 20 times the mean particle size of the structure-producing particles form at least a portion of the elevations.

16. The process as claimed in claim 8, wherein the mixture of particles comprises from 1 to 75 percent by weight of the wax particles.

17. The process as claimed in claim 16, wherein the wax particles consist of ethylenically unsaturated polymers which may optionally also be fluorinated or perfluorinated.

18. The self-cleaning surface as claimed in claim 1, wherein the wax particles have a mean particle size which is from 0.5-0.9 times the mean particle size of the structure-producing particles.

19. The self-cleaning surface as claimed in claim 18, wherein the structure-producing particles and the wax particles are at least partially embedded in the substrate and the average height of the elevations formed from the structure-producing particles is greater than the average height of the elevation formed by the wax particles.

20. The self-cleaning surface as claimed in claim 19, wherein the structure-producing particles have a fissured structure surface comprising fissures having a depth in the nanometer range.

21. The self-cleaning surface as claimed in claim 1, wherein the mixture of the hydrophobic particle is present as a monolayer on the surface of the substrate.

22. The self-cleaning surface of claim 20, wherein the wax particles are not adhesively bonded to the fissures of the structure-producing particles.

23. The self-cleaning surface of claim 1, wherein the self-cleaning surface is present on a polymethylmethacrylate sheet;
wherein a drop of water runs off the self-cleaning surface set at an angle of 90° to the horizontal after 50 cycles of an abrasion test; and
wherein the abrasion test comprises contacting the self-cleaning surface with a rotating PET nonwoven of 250 g/m$^2$ and 2 cm in diameter loaded with a weight of 611 gram.

24. The self-cleaning surface of claim 23, wherein the drop of water rolls off the self-cleaning surface after 100 cycles of the abrasion test.

25. The self-cleaning surface of claim 23, wherein a drop of water rolls off the self-cleaning surface after 200 cycles of the abrasion test.

26. A self-cleaning surface, comprising:
a substrate,
one or more structure-producing particles selected from the group consisting of a semimetal oxide, a metal oxide, a silica and a metal powder, and
one or more wax particles consisting of wax;
wherein the structure-producing particles and the wax particles are at least partially embedded in the substrate,
wherein a plurality of elevations is present on the surface of the self-cleaning surface, wherein the elevations are the portions of the structure-producing particles and the wax particles, and the height of the elevations is the height of the particles measured from the surface of the substrate,
wherein the mean height of the elevations of the structure-producing particles is greater than the mean height of the elevations of the wax particles, and
wherein the structure-producing particles have a surface comprising an irregular fine structure of one or more of heights, widths and spacings in the nanometer range; and
wherein both the structure-producing particles and the wax particles form the elevations.

27. The self-cleaning surface as claimed in claim 26, wherein the structure-producing particles have a mean particle size of from 20 nm to 50 μm.

28. The self-cleaning surface as claimed in claim 27, wherein the structure-producing particles are selected from alumina, precipitated or pyrogenic silica and have a fine structure in the nanometer range.

29. The self-cleaning surface as claimed in claim 26, wherein the wax particles have a mean particle size which is from 0.5 to 20 times the mean particle size of the structure-producing particles.

30. The self-cleaning surface as claimed in claim 29, wherein the wax particles are preset in an amount of from 1 to 75 percent by weight of the weight of the total weight of the structure-producing particles and the wax particles.

31. The self-cleaning surface as claimed in claim 26, wherein the wax particles have a mean particle size which is from 0.5-0.9 times the mean particle size of the structure-producing particles.

32. The self-cleaning surface as claimed in claim 31, wherein the structure-producing particles and the wax particles are at least partially embedded in the substrate and the average height of the elevations formed from the structure-producing particles is greater than the average height of the elevation formed by the wax particles.

33. The self-cleaning surface as claimed in claim 32, wherein the structure-producing particles have a fissured structure surface comprising fissures having a depth in the nanometer range.

34. The self-cleaning surface of claim 33, wherein the wax particles are not adhesively bonded to the fissures of the structure-producing particles.

35. The self-cleaning surface of claim 26, wherein the self-cleaning surface is present on a polymethylmethacrylate sheet; and
wherein a drop of water runs off the self-cleaning surface set at an angle of 90° to the horizontal after 50 cycles of an abrasion test, wherein the abrasion test comprises contacting the self-cleaning surface with a rotating PET nonwoven of 250 g/m$^2$ and 2 cm in diameter loaded with a weight of 611 gram.

36. The self-cleaning surface of claim 35, wherein the drop of water rolls off the self-cleaning surface after 100 cycles of the abrasion test.

37. The self-cleaning surface of claim 35, wherein a drop of water rolls off the self-cleaning surface after 200 cycles of the abrasion test.

38. The self-cleaning surface of claim 26, wherein the wax particles consist of at least one fluorinated polymer.

39. The self-cleaning surface as claimed in claim 1, wherein an uncoated surface of the structure-producing particles and a surface of the wax particles are exposed on the surface of the substrate.

40. The self-cleaning surface as claimed in claim 1, wherein an uncoated surface of the structure-producing particles and a surface of the wax particles are the outermost exposed surfaces of the self-cleaning surface.

41. The self-cleaning surface as claimed in claim 26, wherein an uncoated surface of the structure-producing particles and the wax particles are exposed on the surface of the substrate.

* * * * *